UNITED STATES PATENT OFFICE.

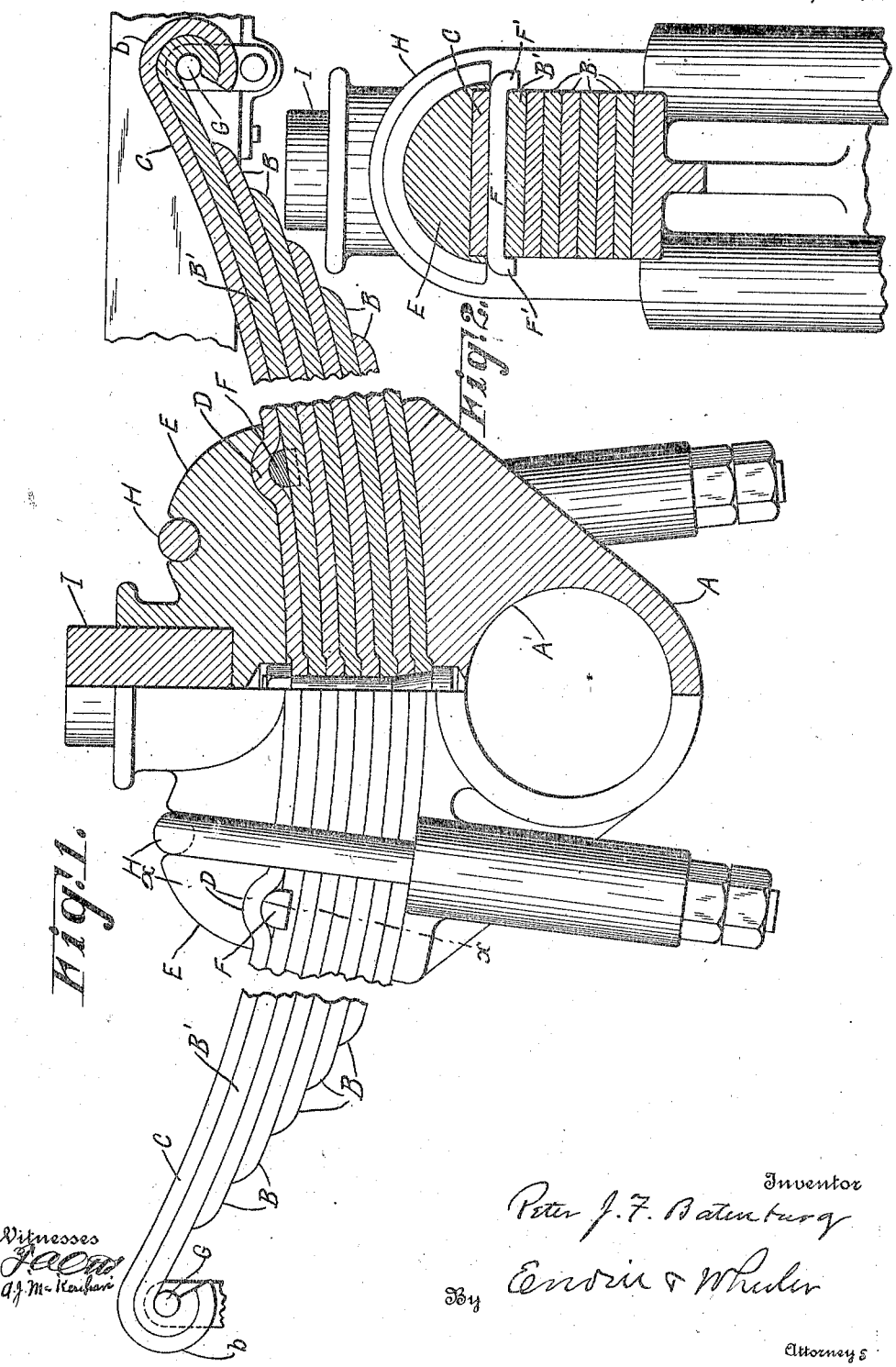

PETER J. F. BATENBURG, OF CLINTONVILLE, WISCONSIN, ASSIGNOR TO FOUR WHEEL DRIVE AUTO COMPANY, OF CLINTONVILLE, WISCONSIN, A CORPORATION OF WISCONSIN.

VEHICLE-SPRING.

1,216,268.   Specification of Letters Patent.   Patented Feb. 20, 1917.

Application filed August 21, 1915. Serial No. 46,613.

*To all whom it may concern:*

Be it known that I, PETER J. F. BATENBURG, a subject of the Queen of the Netherlands, residing at Clintonville, county of Waupaca, and State of Wisconsin, have invented new and useful Improvements in Vehicle-Springs, of which the following is a specification.

My invention relates to improvements in vehicle springs with particular reference to that class of springs which are employed as driving springs for motor driven vehicles. But my invention is also adapted to be advantageously embodied in any form of vehicle spring where a shifting of the spring would otherwise be possible.

The object of my invention is to provide a form of spring which may be securely anchored to the axle of a vehicle and used, if desired, as a driving spring without danger of shifting movements, and without resorting to expedients which would cause crystallization.

In the drawings—

Figure 1 is a side view, partly in elevation and partly in section, of a spring and spring mounting embodying my invention.

Fig. 2 is a sectional view drawn on line $x$—$x$ of Fig. 1.

Like parts are identified by the same reference characters in both views.

The lower clamping member of spring seat A may be of any ordinary construction. This member has an aperture A' through which the vehicle axle extends. The lower leaf B of the spring may also be of ordinary construction, but the upper leaf C is provided with a pair of upwardly extending bends D, one on each side of the center and preferably near the front and rear margins, respectively, of the upper clamping member E. Said upper clamping member is provided with recesses formed in its lower face to receive the anchorage projections D on the upper leaf C, and curved in correspondence therewith. A key pin F is preferably inserted underneath the upwardly projecting bend D in the upper leaf C. The extremities F' of this key pin are down-turned to engage the leaf B' of the spring upon which the leaf C is directly superposed. The pin F is preferably semi-cylindrical or half-oval in cross section.

The leaf C, and, preferably, the leaf B' also, are extended for connection with the vehicle frame and have their extremities bent to form hooks $b$ engaging over a coupling pin or bolt G, connecting these leaves with the frame of the vehicle. The clamping stirrups H and the resilient buffer I may be of any ordinary construction.

It is not essential that the key pins F be employed. Neither is it essential that the locking projections D be formed by bending the leaf C upwardly, although this is a convenient method of forming the projections. The principal function of the key pins F is to preclude the possibility of the bends D, yielding under heavy strains.

I am aware of the fact that attempts have been made, heretofore, to anchor the leaves of the spring at the center, directly above the axle, by forming therein a series of bends which provide projections and recesses, but experiments have demonstrated that where the leaves of a spring are thus bent at the center, they will invariably crystallize and will frequently break at the bends, this being probably due to opposite bending and pushing stresses. It also tends to weaken the leaves of the spring at the point where they are further weakened by the apertures through which the connecting bolt K passes. But by anchoring the upper leaf of my improved spring to the upper clamping member E near the front and rear margins of the latter, and particularly where such anchorage is exterior to the zone of pressure exerted by the clamping stirrup H, crystallization is wholly avoided and a sufficient anchorage is secured to permit supporting and driving the vehicle frame and load by the springs alone. It is therefore possible to dispense with strut rods, even in the construction of heavy trucks.

I claim—

1. A spring leaf, provided with frame engaging and supporting members at its respective ends, and having projections on one face thereof, at points between said ends and the central portion, in combination with a clamping member, suitably socketed to receive said projections and clamping stirrups engaging the clamping member between said projections and the central portion of the spring.

2. The combination, with a set of ordinary spring leaves, arranged in a superposed series, of an upper leaf, provided with upwardly projecting bends on each side of its center, which form transverse ribs on its upper surface and transverse grooves on its lower surface, a key pin extending through each of said transverse grooves between said leaf and the upper leaf of the series below, and means for clamping the spring leaves between upper and lower clamping members, the upper of said members being recessed to receive the ribs formed in the upper leaf, substantially as described.

3. The combination, with a set of ordinary spring leaves, arranged in a superposed series, of an upper leaf, provided with upwardly projecting bends on each side of its center, which form transverse ribs on its upper surface and transverse grooves on its lower surface, a key pin extending through each of said transverse grooves between said leaf and the upper leaf of the series below, said key pin having downwardly projecting extremities engaging the edge margins of the leaf upon which it rests, and means for clamping the spring leaves between upper and lower clamping members, the upper of said members being recessed to receive the ribs formed in the upper leaf.

4. The combination with a set of ordinary spring leaves arranged in a superposed series, of an upper leaf, provided with upwardly projecting bends on each side of its center, a centrally disposed bolt securing the leaves together, and upper and lower clamping members adapted to bind said leaves, the upper of said members having transverse grooves adapted to receive the ribs on the upper leaf and the lower of said members being bored to receive the axle.

In testimony whereof I affix my signature in the presence of two witnesses.

PETER J. F. BATENBURG.

Witnesses:
 A. C. CATHER,
 G. A. HEWITT.